United States Patent [19]

Andruzzi, Jr.

[11] Patent Number: 5,436,933
[45] Date of Patent: Jul. 25, 1995

[54] IDLE CHANNEL NOISE REDUCTION IN A LINE CARD HAVING A DSP EQUALIZER

[75] Inventor: Anthony M. Andruzzi, Jr., Acworth, Ga.

[73] Assignee: Northern Telecom Ltd., Montreal, Canada

[21] Appl. No.: 578,464

[22] Filed: Sep. 7, 1990

[51] Int. Cl.6 ............................................. H04C 27/08
[52] U.S. Cl. .................................. 375/345; 455/234.1; 327/551
[58] Field of Search ........................... 375/98, 106, 99; 455/234; 341/139; 329/350; 307/264

[56] References Cited

U.S. PATENT DOCUMENTS 4,191,995  3/1980  Farrow ............................ 307/264 X
4,625,240  11/1986 Yablonski et al. ................ 375/98 X
4,864,244  9/1989  Sasaki ............................... 375/98 X
5,029,182  7/1991  Cai et al. ........................... 375/98

Primary Examiner—Stephen Chin
Assistant Examiner—Tesfaldet Bocure
Attorney, Agent, or Firm—Foley & Lardner

[57] ABSTRACT

Idle channel noise reduction is achieved in a line card having an analog gain/attenuator, a codec, and a digital signal processor including an equalizer and a digital gain/attenuator. A peak detector samples output from the codec each 8 kHz cycle. A level decision compares the sample to a stored peak value, and replaces the stored peak value with the sample if it is greater. A controller, at a second predetermined interval, increases analog gain in steps and increases digital attenuation in similar steps if the stored peak value is greater than the predetermined threshold. Otherwise, the controller increases analog attenuation in steps and increases digital gain in similar steps.

6 Claims, 4 Drawing Sheets

IDLE CHANNEL NOISE REDUCTION IN A LINE CARD HAVING A DSP EQUALIZER

This invention relates to idle channel noise reduction for a line card and is particularly concerned with reducing idle channel noise resulting from a digital implementation of a telephone line equalizer.

Reference is directed to a copending patent application Ser. No. 578,458 assigned to Northern Telecom Limited, filed on the same day as this application and entitled "DSP Line Equalizer", the entire disclosure of which is hereby incorporated herein by reference.

BACKGROUND OF THE INVENTION

The digital implementation of a line card described in the above identified co-pending application, includes a transmit path having an impedance selector on the line side, an analog gain/attenuator, e.g. a Micro Linear ML2003, a CODEC for providing $\mu$-law compressed data, e.g. a Motorola MC145503 and a digital signal processor (DSP), e.g. a Texas Instruments TMS320E17. The DSP controls the impedance selector and the gain/attenuator in accordance with provisioned settings of impedance and transmit level. The DSP also performs digital equalization. Idle channel noise is of particular concern in the transmit path when digital equalization is used. Idle channel noise is a problem because the $\mu$-law codec generates 14–16 dBrncO of idle channel noise due to quantization alone. The digital equalizer of the copending application provides up to 16 dB of slope and the idle channel noise is increased proportionally to the amount of equalizer gain. Thus, the idle channel noise could be as high as 32 dBrncO.

Any solution to the problem of idle channel noise must reduce the noise to an acceptable level, e.g. 20 dBrncO, and maintain amplitude tracking, quantization distortion, and quality of speech and data transmission at specified levels. Noise reduction techniques such as using squelch and quantization expansion were found not to meet these requirements.

SUMMARY OF THE INVENTION

An object of the present invention is to provide improved idle channel noise reduction in a line card having a digital signal processor equalizer.

In accordance with an aspect of the present invention there is provided a method for idle channel noise reduction in a line card, coupled to a telephone line, having a transmit path including an analog gain/attenuator, a CODEC, and a digital signal processor, said digital signal processor including an equalizer and means for controlling the analog and digital gain/attenuators a digital gain/attenuator, the method comprising the steps of: coding an analog signal derived from the line within the CODEC sampling output from the CODEC at a first predetermined interval; comparing a value obtained by the sampling to a stored peak value; if the value obtained by the sampling is greater than the stored peak value, replacing the stored peak value with the value obtained by the sampling; at a second predetermined interval comparing the stored peak value to a predetermined threshold; generating first and second control signals for, changing analog attenuation by a predetermined amount and changing digital gain by a similar predetermined amount in dependence upon the comparison of the stored peak value to a predetermined threshold and applying the first and second control signals to the analog gain/attenuator and the digital gain/attenuator, respectively.

In accordance with another aspect of the present invention there is provided apparatus for idle channel noise reduction in a line card having a transmit path including an analog gain/attenuator, a CODEC, and a digital signal processor, said digital signed processor including an equalizer and a digital gain/attenuator, comprising: means for sampling output from the CODEC at a first predetermined interval; means for comparing a value obtained by the sampling to a stored peak value, and replacing the stored peak value with the value obtained by the sampling, if the value obtained by the sampling is greater than the stored peak value means for comparing the stored peak value to a predetermined threshold at a second predetermined interval means for generating first and second level control signals for changing analog attenuation by a predetermined Amount respectively and changing digital gain by a similar predetermined amount in dependence upon the comparison of the stored peak value to the predetermined threshold and means for connecting first and second control signals to the analog gain/attenuator and the digital gain/attenuator, respectively.

An advantage of the present invention is a significant reduction in idle channel noise without the use of additional hardware.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
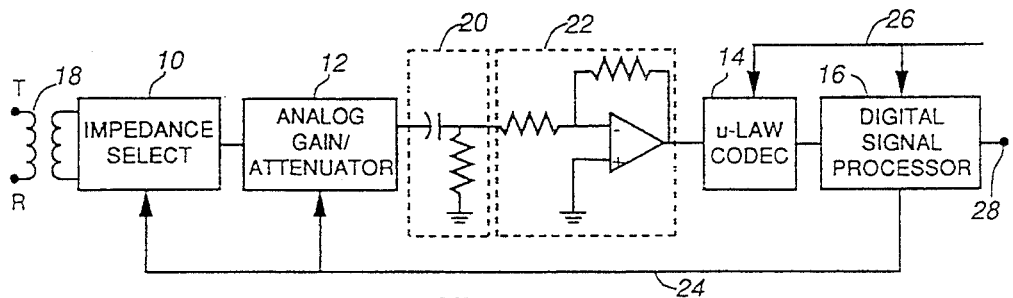
FIG. 1 schematically illustrates a transmit path of a DSP implementation of a line card.

Referring to FIG. 1, there is schematically illustrated a transmit path of a DSP implementation of a line card. The DSP implementation of a line card includes an impedance selector 10, an analog gain/attenuator 12, a CODEC 14 for providing $\mu$-law compressed data and a digital signal processor (DSP) 16. The DSP implementation of a line card also includes a transformer 18 for interfacing with the line and a low frequency compensation circuit 20 and a fixed analog gain circuit 22. The CODEC 14 and the DSP 16 have inputs from a system clock 26. The DSP has an output 28 for transmitting a PCM signal to the network. The DSP 16 controls the impedance selector and gain/attenuator in accordance with provisioned settings of impedance and transmit level via a control channel 24. The transformer 18, the impedance selector 10, the analog gain/attenuator 12, the low frequency compensation circuit 20, the fixed analog gain circuit 22, the CODEC 14 and the DSP 16 are series connected.

In operation, the DSP performs digital equalization. As discussed above, because of the gain available for equalization, idle channel noise is of particular concern in a transmit path. Some form of idle channel noise compensation is required, however, noise reduction techniques such as using squelch and quantization expansion have proved inadequate.

Figure 2:
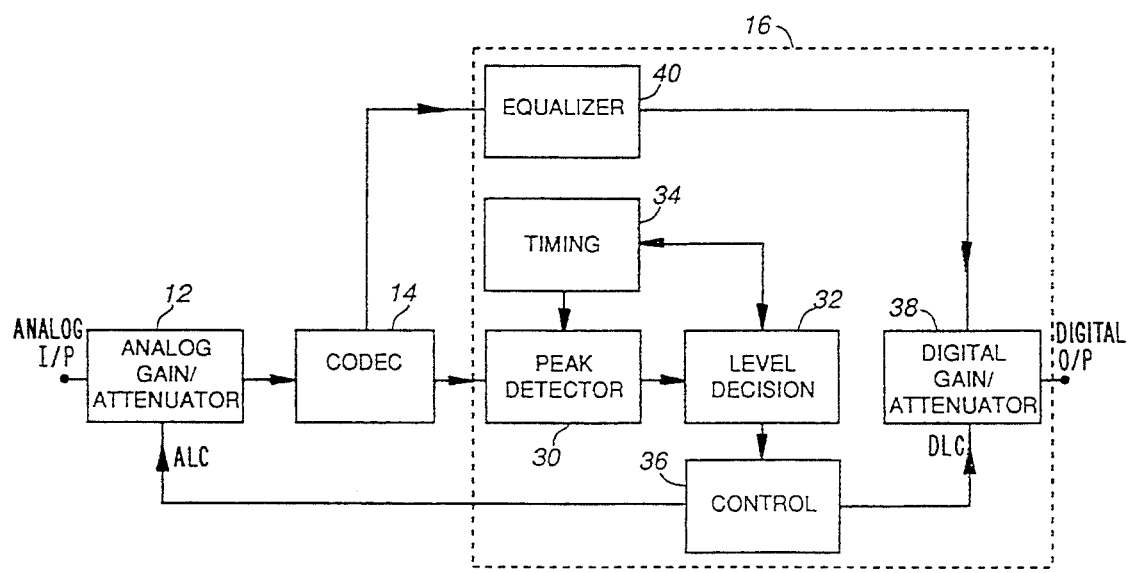
FIG. 2 illustrates in a block diagram, a transmit path of a DSP implementation of a line card in accordance with an embodiment of the present invention.

The transmit path of the DSP implementation of a line card in accordance with an embodiment of the present invention is illustrated in FIG. 2 in a block diagram. For simplicity of explanation only the analog gain/attenuator 12, the CODEC 14 and the DSP 16 are shown. The DSP 16 is shown including a peak detector block 30, a decision block 32, a timing block 34, a control block 36, a digital gain/attenuator block 38 for providing an analog level control signal (ALC) and a digital level control signal (DLC), respectively, thereto, and an equalizer block 40. The peak detector block 30 has inputs for data from the CODEC 14 and clock from the timing block 34, and output to the decision block 32. The equalizer block 40 is connected to the output of the CODEC 14 and has its output connected to the digital gain/attenuator block 38. The timing block 34 is connected to the peak detector 30 and the decision block 32. The control block 36 has an input connected to the decision block 32 and outputs connected to the analog gain/attenuator 12 and the digital gain/attenuator block 38.

In operation, dynamic level adjusting is performed through feedback of the analog level control signal (ALC), from the control block 36 of the DSP to the analog gain/attenuator 12, by the DSP 16. The analog level control signal (ALC) is determined by the decision block 32, which reads information from the peak detector block 30, timed by the timing block 34. The timing block 34 tells the decision block 32 to read the peak and reset the peak detector every N milliseconds. The timing block counts CODEC samples, at 125 microsecond cycles, and flags the decision block 32 and the peak detector 30 when N milliseconds has expired. The timing block 34 is reset by the decision block 32, when the peak detector 30 is read.

The peak detector 30 first rectifies the CODEC samples, then compares each rectified sample to a stored peak value. If the new sample is larger than the stored peak value, the new sample replaces the stored peak value. If the new peak sample is smaller than or equal to the stored peak value, the new sample is discarded. The stored peak value is reset to zero by the decision block after the peak is read.

The decision block 32 is central to the method of dynamic levelling. When the timing block 34 flags the decision block, every N milliseconds, the stored peak value is read and the timing block 34 and peak detector are reset. The decision block compares the stored peak information to a threshold and checks limits on the analog gain/attenuator 12 and the digital gain/attenuator block 38. If the peak is below the threshold and if the limits allow a change, the analog gain is increased by an 1 dB step and the digital gain is decreased by a 1 dB step. Since the increase in gain in one element is equal to the decrease in gain in the other, the end-to-end gain is unchanged, thus maintaining the proper transmit level along the voice frequency path. The process is dynamic because the analog and digital gains are adjusted every N milliseconds. Actual changes in the analog and digital gains are minimized by setting the decision threshold to a low level. The limits used by the decision block for the analog and digital gains are determined by the equalizer setting, the transmit test level point and the range of the analog and digital gain blocks.

The control block 36 converts the decision block 32 step increase or decrease to control signals to the analog and digital gain blocks that is, the analog level control signal (ALC) and the digital level control signal (DLC), respectively. The digital gain block calculates gain by multiplying the equalizer output by a control value between 1 and 0.1585 or0 and $-16$ db respectively. The gain control value is provided by the control block 36.

The analog gain/attenuator 12 is an integrated circuit that provides gain from $+24$ to $-24$ dB in 0.1 dB steps. The primary function of the analog gain element is to provide the gain to meet the full range of test level points at all of the impedance and equalizer settings required by the transmit path. In the DSP 16, all of the blocks illustrated in FIG. 2, that is the peak detector block 30, the decision block 32, the timing block 34, the control block 36, the digital gain/attenuator block 38, and the equalizer block 40, are carried out in DSP firmware. FIGS. 3–6 provide flow charts for the DSP firmware implementation.

Figure 3:
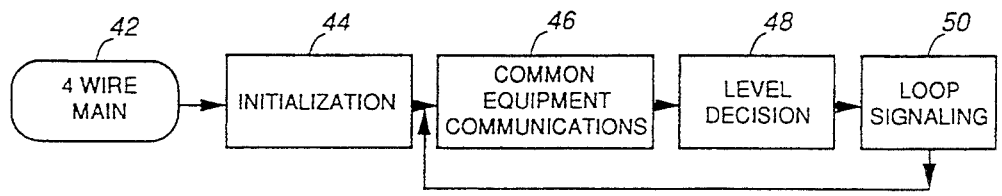
FIG. 3 illustrates as a flow chart the method of operating the line card of FIG. 1, in accordance with an embodiment of the present invention, as carried out by the DSP firmware.

FIG. 3 illustrates as a flow chart the method of operating the line card of FIG. 1, as carried out by the DSP firmware. The method includes an identifying block 42 followed by an initialization block 44. Once initialized a common equipment communications block 46, a level decision block 48 and a loop signalling block 50 run cyclically. The dynamic levelling decision occurs at the decision level block 48. This main loop is interrupted at regular intervals to run a program which provides the services of the line card including dynamic level controlling.

Figure 4:
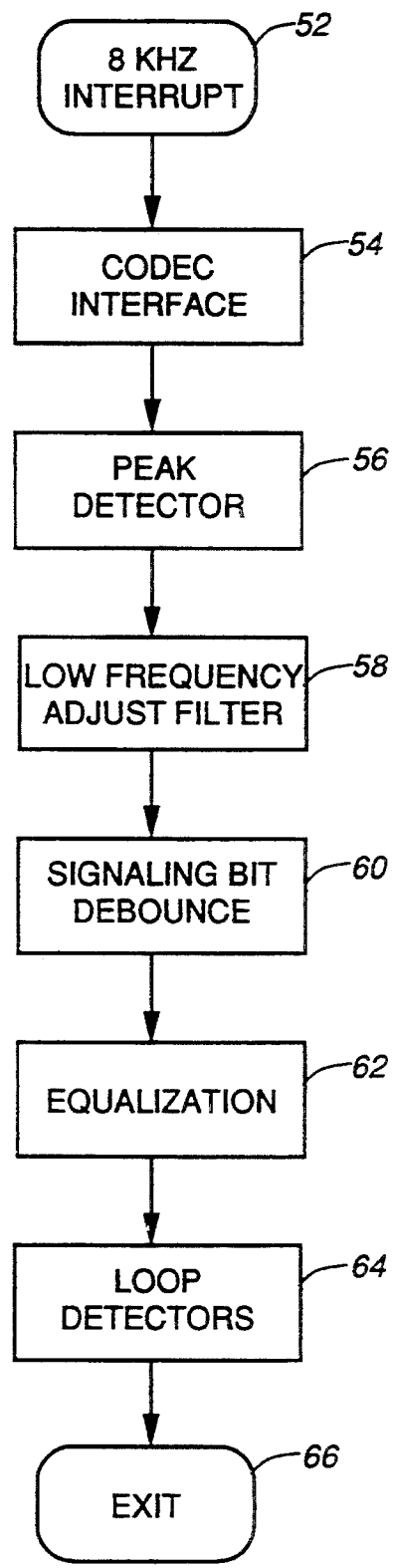
FIG. 4 illustrates as a flow chart the 8 kHz interrupt service of the line card of FIG. 2, as carried out by the DSP in accordance with an embodiment of the present invention.

FIG. 4 illustrates as a flow chart the 8 kHz interrupt service of the line card of FIG. 2, as carried out by the DSP in accordance with an embodiment of the present invention. The interrupt service includes an identifying block 52, a CODEC interface block 54, a peak detector block 56, a low frequency adjust filter block 58, a signalling bit debounce block 60, an equalization block 62, a loop detectors block 64, and an exit block 66. The peak detection occurs at the peak detector block 56. The interrupt service is run at intervals of 125 microseconds.

Figure 5:
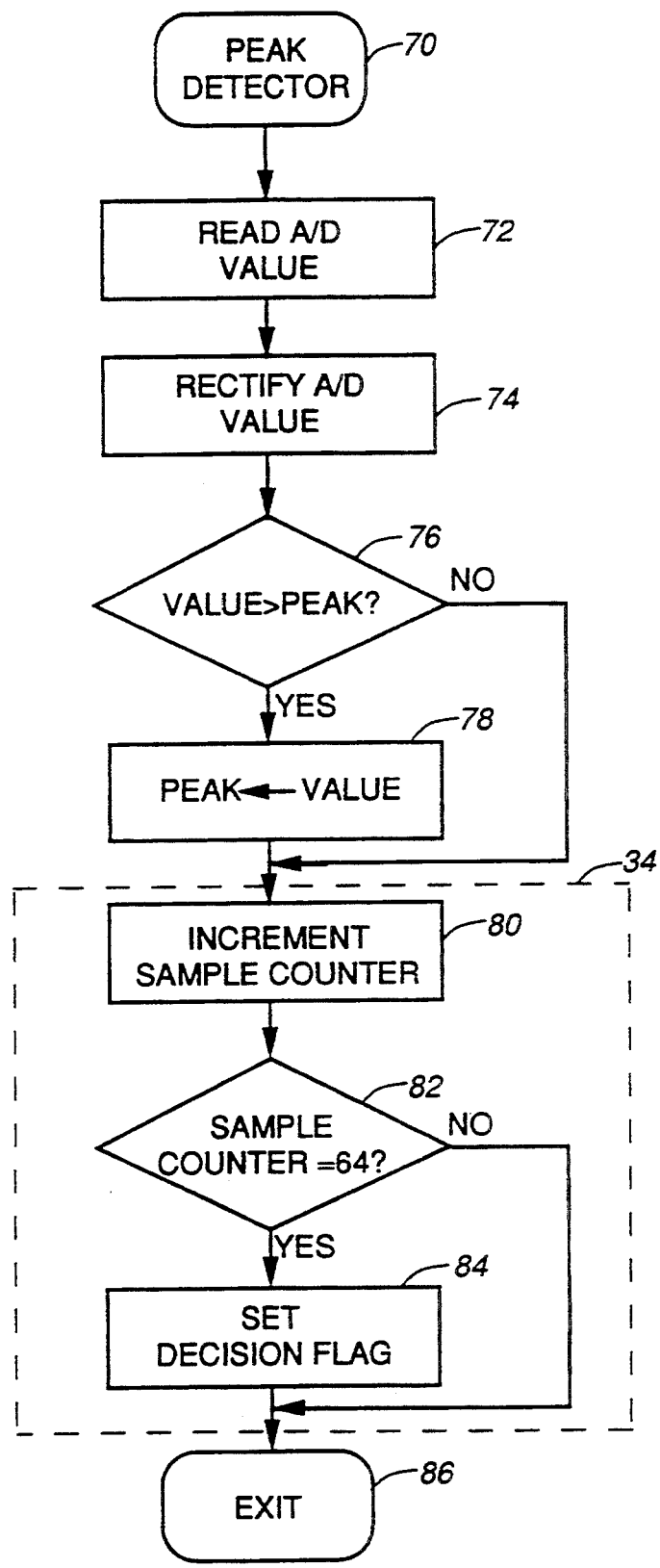
FIG. 5 illustrates as a flow chart the steps of peak detection of FIG. 4.

FIG. 5 illustrates as a flow chart the steps of peak detection of FIG. 4. The peak detector steps include an identifying block 70, a read A/D value block 72, a rectify A/D value block 74, and a value >peak? decision block 76. A yes response leads to value replaces peak block 78 and an increment sample counter block 80. A no response leads directly to the increment sample counter block 80. This is followed by a sample counter =64? decision block 82. A yes leads to a set decision flag block 84 and an exit block 86. A no leads directly to the exit block 86. The increment sample counter block 80, the sample counter =64? decision block 82, and the set decision flag block 84 are part of the timing block 34 of FIG. 2. Thus, the peak value is reset every 8 milliseconds.

Figure 6:
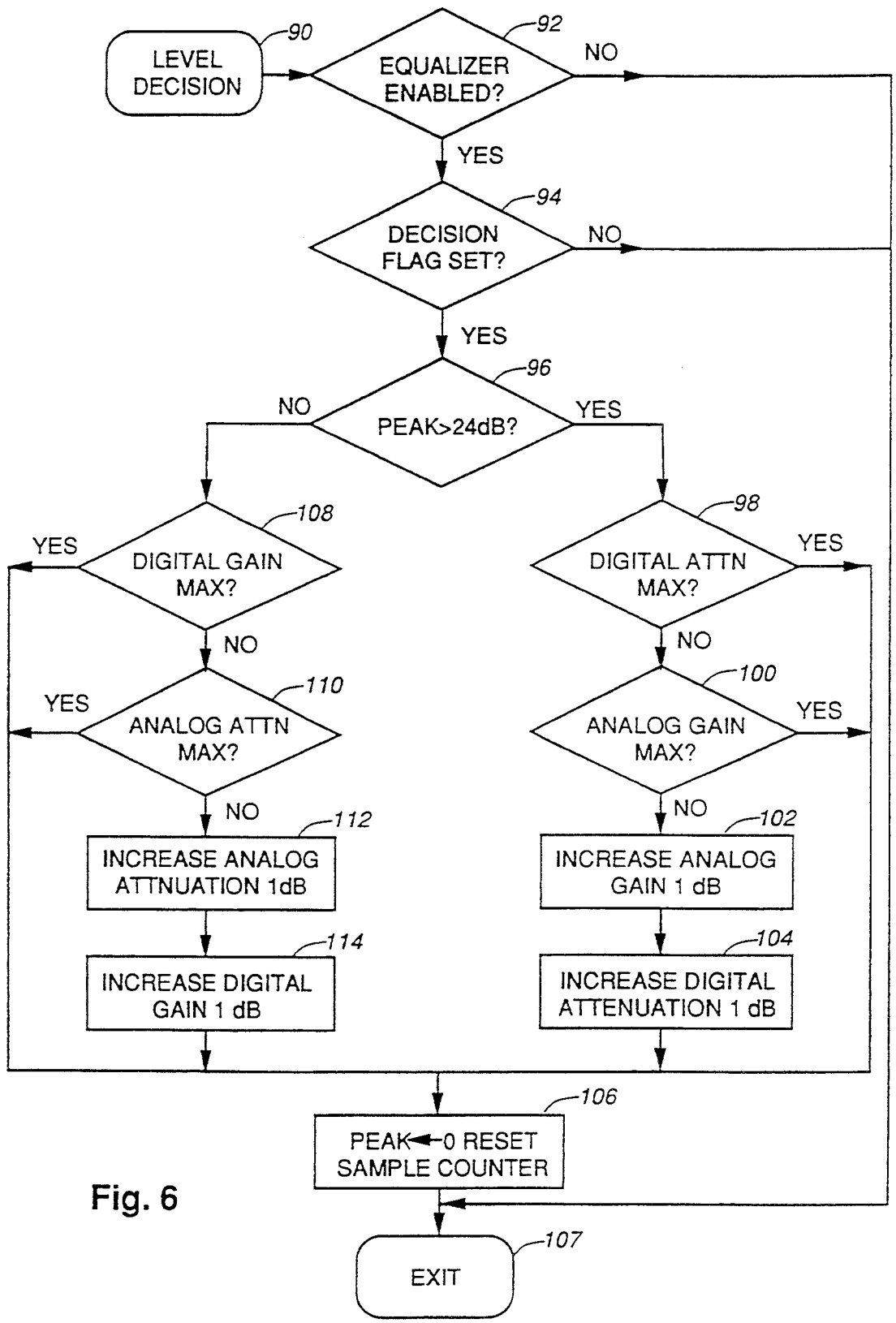
FIG. 6 illustrates as a flow chart the steps of level decision of FIG. 3.

FIG. 6 illustrates as a flow chart the steps of level decision of FIG. 3. The level decision steps include an identifying block 90 followed by an equalizer enabled? block 92. A yes response leads to a decision flag set? block 94. A yes response leads to a peak >24 dB? block 96. A yes response leads to a digital attenuation at maximum? block 98. A no response leads to an analog gain at maximum? block 100. A no response leads to an increase analog gain 1 dB block 102. This is followed by an increase digital attenuation 1 dB block 104, a reset peak to zero and reset sample counter block 106, and an exit block 107. A no response to either the equalizer enabled? block 92 or the decision flag set? block 94 leads directly to the exit block 107. A yes response to either the digital attenuation at maximum? block 98 or the analog gain at maximum? block 100 leads to the reset peak to zero and reset sample counter block 106. A no response to the peak >24 dB? block 96 leads to a digital gain at maximum? block 108. A no response leads to an analog attenuation at maximum? block 110. A no response leads to an increase analog attenuation 1 dB block 112. This is followed by an increase digital gain 1 dB block 114, the reset peak to zero and reset sample counter block 106, and the exit block 107. A yes response to either the digital gain at maximum? block 108 or the analog attenuation at maximum? block 110 leads to the reset peak to zero and reset sample counter block 106.

In operation, the main loop, illustrated in FIG. 3, runs in cyclical fashion until interrupted by the interrupt service illustrated in FIG. 4. The interrupt service provides the various function of the line card, the function of interest being that provided by the peak detector block 56. The detail of the peak detector block 56 is shown in FIG. 4. On every 8 kHz cycle, that is every 125 microseconds, the peak detector performs the steps of FIG. 4. The first step is reading of the CODEC samples as represented by the read a/d value block 72. The samples are then rectified to provide a peak value at rectify a/d value block 74. A decision made at the value >peak? block 76 causes, either the stored peak value to be replaced by the current sample if the current sample is greater, at the replace peak with value block 78, or the current sample to be rejected, by skipping block 78, if the current sample is less than or equal to the stored peak value. The timing block 34 of FIG. 3, provides the steps of blocks 80, 82, and 84, which causes the decision flag to be set every 64(8 Hz cycles) or once every 64(125 µs) =8 ms.

The decision level block 48 of FIG. 3 is executed as part of the main loop, however it depends upon the peak value from block 78 and the decision flag from block 84 of the peak detector of FIG. 5. As discussed above, the peak value is checked each 8 kHz cycle (i.e. every 125 µs) and the decision flag is set after 64(8 kHz cycles)(i.e. every 8 ms).

The level decision, as shown in FIG. 5, first determines whether the equalizer is enabled at the equalizer enabled? block 92. If it is not the level decision method is terminated at the exit block 107, as idle channel noise is only a problem when the equalizer is enabled. Next it is determined if the decision flag has been set by the peak detector at the block decision flag set? block 94. If it has not been set, the level decision method is terminated at the exit block 107. Then, the stored peak value is compared to a threshold value of 24 dB at the peak >24 dB? block 96.

If the stored peak value is greater than the threshold value of 24 dB, the digital attenuation and analog gain limits are checked, by blocks 98 and 100, respectively. If either limit is exceeded, the stored peak value is reset to zero and the sample counter is reset by block 106. If neither limit has been reached, the analog gain is increased 1 dB by block 102 and the digital attenuation is increased 1 dB by block 104. Then the stored peak value is reset to zero and the sample counter is reset by block 106.

If the stored peak value is less than or equal to the threshold value of 24 dB, the digital gain and analog attenuation limits are checked, by blocks 108 and 110, respectively. If either limit is exceeded, the stored peak value is reset to zero and the sample counter is reset by block 106. If neither limit has been reached, the analog attenuation is increased 1 dB by block 112 and the digital gain is increased 1 dB by block 114. Then the stored peak value is reset to zero and the sample counter is reset by block 106.

Numerous modifications, variations and adaptations may be made to the particular embodiments of the invention described above without departing from the scope of the invention, which is defined in the claims.

What is claimed is:

1. A method for idle channel noise reduction in a line card coupled to a telephone line, having a transmit path including an analog gain/attenuator, a CODEC, and a digital signal processor, said digital signal processor including an equalizer and a digital gain/attenuator in the transmit path, and means for controlling the analog and digital/gain attenuators, the method comprising the steps of:
    coding an analog signal derived from the line within the CODEC;
    sampling output from the CODEC at a first predetermined interval;
    comparing each value obtained by the sampling to a stored peak value;
    if the value obtained by the sampling is greater than the stored peak value, replacing the stored peak value with the value obtained by the sampling;
    at a second predetermined interval, comparing the stored peak value to a predetermined threshold;
    generating first and second control signals for changing analog attenuation by a predetermined amount and changing digital gain by a similar predetermined amount in dependence upon the comparison of the stored peak value to a predetermined threshold; and
    applying the first and second control signals to the analog gain/attenuator and the digital gain/attenuator, respectively.

2. A method as claimed in claim 1, wherein the step of generating first and second level control signals in dependence upon the comparison, generates a first level control signal for increasing analog gain by a predetermined amount and a second level control signal for increasing digital attenuation by a similar predetermined amount if the stored peak value is greater than the predetermined threshold, whereby end-to-end gain for the transmit path is unchanged by the combined effect of the analog and digital gain/attenuator.

3. A method as claimed in claim 1, wherein the step of generating first and second level control signals in dependence upon the comparison, generates a first level control signal for increasing analog attenuation by a predetermined amount and a second level control signal for increasing digital gain by a similar predetermined amount if the stored peak value is less than or equal to the predetermined threshold, whereby end-to-end gain for the transmit path is unchanged by the combined effect of the analog and digital gain/attenuator.

4. Apparatus for idle channel noise reduction in a line card coupled to a telephone line, having a transmit path including an analog gain/attenuator, a CODEC for coding an analog signal derived from the line, and a digital signal processor, said digital signal processor including an equalizer, and a digital gain/attenuator in the transmit path, comprising:

means for sampling output from the CODEC at a first predetermined interval;

means for comparing each value obtained by the sampling to a stored peak value, and replacing the stored peak value with the value obtained by the sampling, if the value obtained by the sampling is greater than the stored peak value;

means for comparing the stored peak value to a predetermined threshold at a second predetermined interval;

means for generating first and second level control signals for changing analog attenuation by a predetermined amount and changing digital gain by a similar predetermined amount, respectively, in dependence upon the comparison of the stored peak value to a predetermined threshold; and means for connecting first and second control signals to the analog gain/attenuator and the digital gain/attenuator, respectively.

5. Apparatus as claimed in claim 4, wherein the means for comparing the sampled value to the stored peak value includes:

a peak detector connected to the codec for rectifying each CODEC output sample, comparing each sample to a stored peak value and replacing the stored peak value with a value of the new sample if said value of the new sample is larger than the stored peak value; and wherein the means for comparing the stored peak value to the predetermined threshold includes:

i) a timing block connected to the peak detector for providing the second time interval; and ii) a decision block connected to the peak detector and the timing block for reading the stored peak value in the peak detector at the second time interval, comparing it to the predetermined threshold, checking limits on the analog and digital gain/attenuation, and providing a decision on changing the analog and digital gain/attenuation is dependence upon the comparison of the stored peak value to the predetermined threshold.

6. Apparatus as claimed in claim 5, wherein the means for generating first and second control signals includes a control block for converting the decision from the decision block, on changing the analog and digital gain/attenuation to the first and second level control signals, the control block having first and second outputs connected to the analog and digital gain/attenuators, respectively, for providing first and second control signals thereto.

* * * * *